Patented June 27, 1933

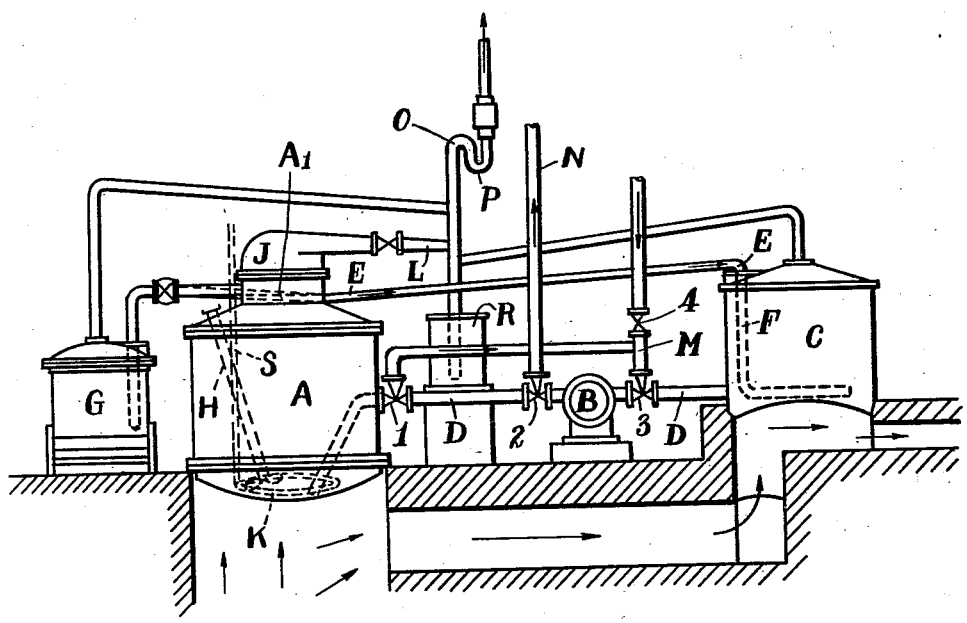

1,915,555

UNITED STATES PATENT OFFICE

JOSEF SOMMER, OF DUSSELDORF, GERMANY, AND SIDNEY JAMIESON RALPH, OF LONDON, ENGLAND

PROCESS FOR THE PRODUCTION OF THICKENED OIL WITH ADDITION OF WOOD OIL AND MEANS THEREFOR

Application filed August 29, 1931, Serial No. 560,192, and in Great Britain September 17, 1930.

The present invention relates to an improved process for the production of thickened oil with addition of wood oil and means therefor.

The production of thickened or stand oils, composed of a mixture of linseed or like oils polymerizable by heat and wood oil, the latter being also known as Chinese wood oil or tung oil, consists usually of boiling a mixture of the two oils, the proportion of wood oil ranging usually between 5% and 30% of the linseed oil used, in a cauldron, the heat being applied by any known or desired means. In this way thickened or stand oils are produced very quickly, but they consist principally of a solution of thickened wood oil, which rapidly thickens or polymerizes, in a medium of practically unchanged or unthickened linseed oil, that is, linseed oil which has not to any great extent been polymerized, linseed oil not polymerizing or thickening very quickly. The product resulting from this process while possessing features of certain value, does not possess such valuable properties as a thickened or stand oil composed of a mixture of both polymerized linseed and wood oil.

Another method employed has been to boil wood oil in very small batches (so as to obtain close heat control) and then to mix the product obtained with a suitable grade of stand linseed oil. It is, however, difficult to obtain a homogeneous mixture in the cold.

From a technical point of view of varnish and paint production the most satisfactory thickened or stand oil would be one consisting of a homogeneous mixture of wood and linseed oils, both of which are thickened or polymerized, a paint or varnish embodying such a thickened or stand oil would possess more body, greater brilliance and be more resistant to weather.

It has hitherto been impossible however to produce in one working such a mixture of both thickened or polymerized oils, in the cauldrons hitherto used. It was first necessary to thicken the linseed oil, allow it to cool and then to add the required amount of wood oil and lastly heat treat the mixed oils, such a process entailing a great loss of time and a waste of fuel and heat.

According to the present invention these disadvantages are eliminated, one of the objects being the production of a thickened or stand oil composed of thickened or polymerized linseed or like oil in which is dissolved a thickened or polymerized wood oil. Another object of the present invention is the thickening or polymerizing of wood oil in a solvent consisting of linseed or like oil, such polymerization taking place without gelatinization, while a further object of the present invention is the production of a thickened or stand oil both expeditiously and cheaply, and in one working.

The apparatus of which one constructional example is shown in the accompanying drawing consists of a principal cauldron A for the linseed or like oil, this cauldron being provided with a stirrer H and being connected by a pump B with the secondary cauldron C containing the wood oil which can be heated, for instance by flue gases coming from the fire which heats the principal cauldron A. The secondary cauldron C is filled with the wood oil which it is intended to add to the linseed oil when this has reached the required consistency in the principal cauldron A.

The method of working is as follows:—

The pot A having been filled up to the level of the overflow pipe J with cold linseed or like oil is heated up to the polymerizing temperature, and the container G receives the oil which overflows owing to expansion due to the increase in temperature. When the polymerizing temperature has been attained a cock between A and G can be closed down.

The temperature attained and the time at which the oil is kept at that temperature depends upon the degree of polymerization necessary to attain a certain viscosity, and again the degree of viscosity depends upon the commercial use of the product, such time and temperature to produce the desired viscosity for a given product being readily determined by a chemist skilled in the art.

To produce a stand oil for a varnish having high water-resisting properties such as for use in exterior work the following mixture can be used and temperature conditions observed, by way of example:

60 parts of linseed oil are heated to 310° C. and held at that temperature until the required consistency is reached. 40 parts of wood oil are heated to 150° C. and dispersed in the hot linseed oil. The mixed oils can then be held in the apparatus until the required degree of polymerization is obtained.

For a varnish for interior work it suffices to use less wood oil. For example 90 parts of linseed oil may be heated to 300° C. and 10 parts of wood oil heated to 100° C. and dispersed therein.

The pump B then conveys the wood oil contained in the secondary cauldron C and which has been heated to below the point of rapid polymerization and safely below the point of gelatinization, through the tube D to the bottom of the cauldron A and the perforated coil K. The wood oil is thus mixed with the hot thickened linseed oil and the contents of the cauldron A are caused to circulate through the pipe E into the secondary cauldron C in which for the purpose of being thoroughly mixed it enters this cauldron C through appropriate dispersing means such as a perforated coil or nozzles of the pipe F. The process of pumping from one cauldron into the other proceeds as a continuous cycle until a uniform mixture and thickening has been obtained.

In this way the wood oil heated to below the point of rapid polymerization is introduced into the hot polymerized linseed or like oil, in such proportions and state of dispersion, that the hot wood oil is instantaneously further heated by the hot linseed oil to the temperature of polymerization or to approximately that temperature, without having an opportunity to gelatinize and the two polymerized oils are thoroughly incorporated one with another.

Instead of a pump, some other suitable means can be used for the purpose of mixing the oils, such as, for instance, pressure by inert gases. For example the oil may be blown from one vessel into an overhead relief tank from which it flows by gravity into a second vessel, suitable relief and non-return valves being provided in the circuit. Or an injector type of circulating device may be used actuated by compressed inert gas.

As conducing to the production of perfectly transparent products and the avoidance of objectionable smell, the apparatus may be sealed by an inert gas.

Conveniently and advantageously, carbon dioxide or other inert gas is supplied through a pipe S leading to a perforated coil K submersed in the linseed oil, the gas exhausting through the escape pipe L, similar provision being made in connection with the vessel (C) is desired.

By turning the cocks 1, 2, 3, 4 in a suitable way the mixing pump (B) can also be used for the purpose of filling or emptying the cauldrons (A) and (C). M is the feed pipe and N the discharge pipe connecting the apparatus respectively to the places where the raw and the finished materials are stored.

O is a pipe which takes the exhaust fumes and gases from the cauldrons. These gases bubble through the oil trap in the siphon P indicated, and R is a small pot in which the condensate is collected.

The wood oil may be appropriately dispersed in the linseed oil in the cauldron A through a suitable nozzle or like which may be of the ejector type wherein the velocity of the outgoing wood oil from the pump B is used to carry with it indrawn linseed oil before ejection, or the pipe could be connected to the same perforated coil as is used for distributing carbon dioxide in the vessel A.

What we claim is:—

1. Process for the production of a thickened or stand oil composed of polymerized wood oil and oil less rapidly polymerized by heat, which consists in heating and polymerizing said latter oil and introducing thereinto wood oil, heated to below the point of rapid polymerization and safely below the point of gelatinization, in such proportions and state of dispersion, that the wood oil is instantaneously further heated to the temperature of polymerization without having an opportunity to gelatinize, and the two polymerized oils are thoroughly incorporated one with another.

2. Process for the production of a thickened or stand oil composed of polymerized linseed oil and polymerized wood oil, which consists in introducing wood oil, heated to below the point of rapid polymerization and safely below the point of gelatinization, into hot polymerized linseed oil, in such proportions and state of dispersion, that the hot wood oil is instantaneously further heated in the hot linseed oil to the temperature of polymerization or to approximately that temperature without having an opportunity to gelatinize, and the two polymerized oils are thoroughly incorporated one with another.

3. Process for the production of a thickened or stand oil, which consists in heating wood oil to below the point of rapid polymerization and safely below the point of gelatinization and dispersing it under pressure into a hot thickened or polymerized oil of a character that polymerizes less rapidly than wood oil.

4. Process for the production of a thickened or stand oil distinguished by the fact that wood oil, heated to below the point of rapid polymerization and safely below the point of gelatinization is dispensed under pressure into hot thickened or polymerized linseed oil.

5. Process for the production of a thickened or stand oil, which consists in heating wood oil to below the point of rapid polymerization and safely below the point of gelatinization, dispersing it under pressure into a hot thickened or polymerized oil of a character that polymerizes less rapidly than wood oil, and stirring the mixed oils.

6. Process for the production of a thickened or stand oil, which consists in heating wood oil to below the point of rapid polymerization and safely below the point of gelatinization, dispersing it under pressure into a hot thickened or polymerized oil of a character that polymerizes less rapidly than wood oil and circulating the oils so as to promote a thorough mixture.

7. Process for the production of a thickened or stand oil, which consists in heating wood oil to below the point of rapid polymerization and safely below the point of gelatinization, dispersing it under pressure into a hot thickened or polymerized oil of a character that polymerizes less rapidly than wood oil, stirring the mixed oils, and circulating them so as to promote a thorough mixture.

8. Process for the production of a thickened or stand oil comprising wood oil and an oil less rapidly polymerized by heat, which consists in simultaneously heating the two oils so as to polymerize the less rapidly polymerizable oil and at the same time heat the wood oil to below the point of rapid polymerization and safely below the point of gelatinization; leading the wood oil thus heated to the hot polymerized oil and dispersing it therein.

9. Process for the production of a thickened or stand oil comprising wood oil and an oil less rapidly polymerized by heat, which consists in simultaneously heating the two oils so as to polymerize the less rapidly polymerizable oil and at the same time heat the wood oil to below the point of rapid polymerization and safely below the point of gelatinization; leading the wood oil thus heated to the hot polymerized oil and dispersing it therein under pressure and circulating the mixed oils so as to effect a thorough mixing of the oils.

10. Process for the production of a thickened or stand oil comprising wood oil and an oil less rapidly polymerized by heat, which consists in simultaneously proportionately heating the two oils from a single source of heat so as to polymerize the less rapidly polymerizing oil at the same time as the wood oil is being heated to below the point of rapid polymerization and safely below the point of gelatinization; leading the wood oil thus heated to the hot polymerized oil and dispersing it therein.

11. Process for the production of a thickened or stand oil comprising oil readily polymerized by heat and an oil less readily polymerized by heat, which consists in heating the less readily polymerizable oil substantially to polymerization temperature, heating the more readily polymerizable oil to below the point of rapid polymerization and safely below the point of gelatinization and dispersing one oil into the other so as thoroughly to incorporate the oils one with another without producing undesirable gelatinization.

In testimony whereof we affix our signatures.

JOSEF SOMMER.
SIDNEY JAMIESON RALPH.